US009236971B2

(12) United States Patent
Tamaki et al.

(10) Patent No.: US 9,236,971 B2
(45) Date of Patent: Jan. 12, 2016

(54) BANDWIDTH ALLOCATION DEVICE AND BANDWIDTH ALLOCATION METHOD

(71) Applicant: NIPPON TELEGRAPH AND TELEPHONE CORPORATION, Tokyo (JP)

(72) Inventors: Shinya Tamaki, Tokyo (JP); Tomoaki Yoshida, Tokyo (JP); Hirotaka Nakamura, Tokyo (JP); Shin Kaneko, Tokyo (JP); Shunji Kimura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/350,953

(22) PCT Filed: Dec. 18, 2012

(86) PCT No.: PCT/JP2012/082772
§ 371 (c)(1),
(2) Date: Apr. 10, 2014

(87) PCT Pub. No.: WO2013/094594
PCT Pub. Date: Jun. 27, 2013

(65) Prior Publication Data
US 2014/0294391 A1    Oct. 2, 2014

(30) Foreign Application Priority Data
Dec. 21, 2011   (JP) ................................. 2011-280555

(51) Int. Cl.
*H04B 10/27*    (2013.01)
*H04J 14/02*    (2006.01)
(Continued)

(52) U.S. Cl.
CPC ............ *H04J 14/0227* (2013.01); *H04B 10/27* (2013.01); *H04B 10/272* (2013.01);
(Continued)

(58) Field of Classification Search
CPC ..... H04B 10/27; H04B 10/272; H04J 14/025; H04J 14/0257
USPC ................................. 398/43, 66, 68
See application file for complete search history.

(56) References Cited

U.S. PATENT DOCUMENTS

| 5,212,577 A | * | 5/1993 | Nakamura | ............. H04B 10/50 398/42 |
| 2006/0115271 A1 | * | 6/2006 | Hwang | ............... H04J 14/0226 398/72 |

(Continued)

FOREIGN PATENT DOCUMENTS

| JP | 2007228291 A | 9/2007 |
| JP | 2007324885 | 12/2007 |

(Continued)

OTHER PUBLICATIONS

Japanese Office Action dated Sep. 26, 2014 corresponding to Japanese Patent Application No. 2013-550283; 8 pages.

(Continued)

*Primary Examiner* — Oommen Jacob
(74) *Attorney, Agent, or Firm* — Ohlandt, Greeley, Ruggiero & Perle, L.L.P.

(57) ABSTRACT

An OLT controller makes each optical transceiver transmit a search signal at a prescribed time so that the search signals reach all ONU connection ends of an optical transmission path. In the case where an ONU connected to the ONU connection end of the optical transmission path is unregistered, when the ONU controller receives the search signal, the ONU controller tunes a wavelength of an optical transmitter of the ONU to a wavelength corresponding to the search signal and makes the optical transmitter transmit a response signal to an OLT.

18 Claims, 14 Drawing Sheets

(51) Int. Cl.
- *H04J 14/00* (2006.01)
- *H04L 12/12* (2006.01)
- *H04L 12/44* (2006.01)
- *H04B 10/272* (2013.01)
- *H04L 12/413* (2006.01)

(52) U.S. Cl.
CPC ........... *H04J14/025* (2013.01); *H04J 14/0246* (2013.01); *H04J 14/0257* (2013.01); *H04J 14/0267* (2013.01); *H04J 14/0282* (2013.01); *H04L 12/12* (2013.01); *H04L 12/413* (2013.01); *H04L 12/44* (2013.01); *Y02B 60/34* (2013.01)

(56) References Cited

U.S. PATENT DOCUMENTS

| | | | |
|---|---|---|---|
| 2006/0127091 A1* | 6/2006 | Yoo | H04J 14/0226 398/69 |
| 2007/0092256 A1* | 4/2007 | Nozue et al. | 398/72 |
| 2009/0016726 A1* | 1/2009 | Suzuki et al. | 398/79 |
| 2010/0158520 A1* | 6/2010 | Han | H04Q 11/0067 398/58 |
| 2012/0328287 A1* | 12/2012 | Grosso | H04J 14/0282 398/34 |
| 2013/0004172 A1* | 1/2013 | Sugawa | H04J 3/1694 398/72 |
| 2014/0294391 A1* | 10/2014 | Tamaki et al. | 398/68 |

FOREIGN PATENT DOCUMENTS

| | | |
|---|---|---|
| JP | 2008072534 A | 3/2008 |
| JP | 2009290594 | 12/2009 |
| JP | 2010154063 | 7/2010 |
| JP | 2011139320 | 7/2011 |
| JP | 2011228800 | 11/2011 |

OTHER PUBLICATIONS

Nakamura, et al., "Zeta-tunable WDN/TDN-PON using DWBA for flexible service upgrade."; NTT Access Network Service Systems Laboratories, NTT Corporation, 2010 with partial English translation, 3 pp.

International Search Report dated Jan. 29, 2013 corresponding to PCT/JP2012/082772, 1 pp.

International Preliminary Report on Patentability dated Jul. 3, 2014 corresponding to Japanese International Patent Application No. PCT/JP2012/082772; 6 pages.

English translation of Office Action dated Jun. 8, 2015 from corresponding Korean Patent Application No. 2014-7012419.

* cited by examiner

FIG. 8

| SEARCH SIGNAL | DOWNSTREAM TRANSMISSION SOURCE | FILTER PORT OLT SIDE | FILTER PORT ONU SIDE | DESTINATION PON | DOWNLINK WAVELENGTH | UPLINK WAVELENGTH |
|---|---|---|---|---|---|---|
| S1-1 | 21-1 | A1 | B1 | 1 | λd1 | λu1 |
| S1-2 | 21-1 | A1 | B2 | 2 | λd2 | λu2 |
| S1-3 | 21-1 | A1 | B3 | 3 | λd3 | λu3 |
| S1-4 | 21-1 | A1 | B4 | 4 | λd4 | λu4 |
| ... | | ... | ... | ... | ... | ... |
| S1-n | 21-1 | A1 | Bn | n | λdn | λun |
| S2-1 | 21-2 | A2 | B1 | 1 | λd1 | λu1 |
| S2-2 | 21-2 | A2 | B2 | 2 | λd2 | λu2 |
| S2-3 | 21-2 | A2 | B3 | 3 | λd3 | λu3 |
| S2-4 | 21-2 | A2 | B4 | 4 | | |
| ... | | ... | ... | ... | ... | ... |
| S2-n | | A2 | Bn | n | λd(n-1) | λu(n-1) |
| S3-1 | 21-3 | A3 | B1 | 1 | λdn | λun |
| S3-2 | 21-3 | A3 | B2 | 2 | λd1 | λu1 |
| S3-3 | 21-3 | A3 | B3 | 3 | λd2 | λu2 |
| S3-4 | 21-3 | A3 | B4 | 4 | | |
| ... | | ... | ... | ... | ... | ... |
| S3-n | | A3 | Bn | n | λd(n-2) | λu(n-2) |
| ... | ... | ... | ... | ... | ... | ... |
| Sm-1 | 21-m | Am | B1 | 1 | λd2 | λu2 |
| Sm-2 | 21-m | Am | B2 | 2 | λd3 | λu3 |
| Sm-3 | 21-m | Am | B3 | 3 | λd4 | λu4 |
| Sm-4 | 21-m | Am | B4 | 4 | λd5 | λu5 |
| ... | | ... | ... | ... | ... | ... |
| Sm-n | | Am | Bn | n | λd1 | λu1 |

FIG. 9

| SEARCH SIGNAL | UPLINK WAVELE |
|---|---|
| S1-1 | λu1 |
| S1-2 | λu2 |
| S1-3 | λu3 |
| S1-4 | λu4 |
| ... | ... |
| S1-n | λun |
| S2-1 | λun |
| S2-2 | λu1 |
| S2-3 | λu2 |
| S2-4 | λu3 |
| ... | ... |
| S2-n | λu(n-1) |
| S3-1 | λu(n-1) |
| S3-2 | λun |
| S3-3 | λu1 |
| S3-4 | λu2 |
| ... | ... |
| S3-n | λu(n-2) |
| ... | ... |
| Sm-1 | λu2 |
| Sm-2 | λu3 |
| Sm-3 | λu4 |
| Sm-4 | λu5 |
| ... | ... |
| Sm-n | λu1 |

FIG. 10

| SEARCH SIGNAL | INFORMATION INCLUDED IN SEARCH SIGNAL | | INFORMATION CALCULATED ON ONU SIDE | | |
|---|---|---|---|---|---|
| | OLT SIDE PORT | DOWNLINK WAVELENGTH | ONU SIDE PORT | PON | UPLINK WAVELENGTH |
| S1-1 | A1 | $\lambda d1$ | B1 | 1 | $\lambda u1$ |
| S1-2 | A1 | $\lambda d2$ | B2 | 2 | $\lambda u2$ |
| S1-3 | A1 | $\lambda d3$ | B3 | 3 | $\lambda u3$ |
| S1-4 | A1 | $\lambda d4$ | B4 | 4 | $\lambda u4$ |
| ... | ... | ... | ... | ... | ... |
| S1-n | A1 | $\lambda dn$ | Bn | n | $\lambda un$ |
| S2-1 | A2 | $\lambda dn$ | B1 | 1 | $\lambda u1$ |
| S2-2 | A2 | $\lambda d1$ | B2 | 2 | $\lambda u2$ |
| S2-3 | A2 | $\lambda d2$ | B3 | 3 | $\lambda u3$ |
| S2-4 | A2 | $\lambda d3$ | B4 | 4 | ... |
| ... | ... | ... | ... | ... | ... |
| S2-n | A2 | $\lambda d(n-1)$ | Bn | n | $\lambda u(n-1)$ |
| S3-1 | A3 | $\lambda d(n-1)$ | B1 | 1 | $\lambda u(n-1)$ |
| S3-2 | A3 | $\lambda d1$ | B2 | 2 | $\lambda un$ |
| S3-3 | A3 | $\lambda d2$ | B3 | 3 | $\lambda u1$ |
| S3-4 | A3 | $\lambda d3$ | B4 | 4 | $\lambda u2$ |
| ... | ... | ... | ... | ... | ... |
| S3-n | A3 | $\lambda d(n-2)$ | Bn | n | $\lambda u(n-2)$ |
| ... | ... | ... | ... | ... | ... |
| Sm-1 | Am | $\lambda d2$ | B1 | 1 | $\lambda u2$ |
| Sm-2 | Am | $\lambda d3$ | B2 | 2 | $\lambda u3$ |
| Sm-3 | Am | $\lambda d4$ | B3 | 3 | $\lambda u4$ |
| Sm-4 | Am | $\lambda d5$ | B4 | 4 | $\lambda u5$ |
| ... | ... | ... | ... | ... | ... |
| Sm-n | Am | $\lambda d1$ | Bn | n | $\lambda u1$ |

FIG. 11

| SEARCH SIGNAL | DOWNSTREAM TRANSMISSION SOURCE | FILTER PORT | | DESTINATION PON | DOWNLINK WAVELENGTH | UPLINK WAVELENGTH |
|---|---|---|---|---|---|---|
| | | OLT SIDE | ONU SIDE | | | |
| S1-1 | ARBITRARY | A1 | B1 | 1 | λd1 | λu1 |
| S1-2 | | A1 | B2 | 2 | λd2 | λu2 |
| S1-3 | | A1 | B3 | 3 | λd3 | λu3 |
| S1-4 | | A1 | B4 | 4 | λd4 | λu4 |
| ⋮ | | ⋮ | ⋮ | ⋮ | ⋮ | ⋮ |
| S1-n | | A1 | Bn | n | λdn | λun |

FIG. 12

| SEARCH SIGNAL | UPLINK WAVELENGTH |
|---|---|
| S1-1 | $\lambda u1$ |
| S1-2 | $\lambda u2$ |
| S1-3 | $\lambda u3$ |
| S1-4 | $\lambda u4$ |
| ... | ... |
| S1-n | $\lambda un$ |

FIG. 13

| SEARCH SIGNAL | INFORMATION INCLUDED IN SEARCH SIGNAL | | INFORMATION CALCULATED ON ONU SIDE | | |
|---|---|---|---|---|---|
| | OLT SIDE PORT | DOWNLINK WAVELENGTH | ONU SIDE PORT | PON | UPLINK WAVELENGTH |
| S1-1 | A1 | $\lambda d1$ | B1 | 1 | $\lambda u1$ |
| S1-2 | A1 | $\lambda d2$ | B2 | 2 | $\lambda u2$ |
| S1-3 | A1 | $\lambda d3$ | B3 | 3 | $\lambda u3$ |
| S1-4 | A1 | $\lambda d4$ | B4 | 4 | $\lambda u4$ |
| ... | ... | ... | ... | ... | ... |
| S1-n | A1 | $\lambda dn$ | Bn | n | $\lambda un$ |

BANDWIDTH ALLOCATION DEVICE AND BANDWIDTH ALLOCATION METHOD

BACKGROUND

1. Field of the Disclosure

The present disclosure relates to a bandwidth allocation device, which detects an ONU newly connected to an optical communication system, and a bandwidth allocation method.

2. Discussion of the Background Art

Along with the recent rapid spread of the Internet, an access system is required to be increased in capacity, advanced, and economized, and meanwhile, PON (Passive Optical Network) has been investigated as a means for realizing that. The PON is an optical communication system in which a center device and a portion of a transmission path are shared by users, using an optical multiplexer/demultiplexer using an optical passive element, to contribute to economization.

Currently, in Japan, an economic optical communication system, Gigabit Ethernet (registered trademark) Passive Optical Network (GE-PON) in which a transmission capacity of 1 Gbps is shared by up to 32 users with time division multiplexing (TDM) is mainly introduced, whereby an FTTH (Fiber To The Home) service is provided at a realistic price.

In order to respond to the needs of a larger capacity, 10G-EPON with a total band of 10 Gbps class has been investigated as a next-generation optical access system, and international standardization has been completed in 2009. This is an optical communication system in which an increase in capacity is realized by increasing the bit rate of a transceiver, while using a transmission path portion, such as an optical fiber, which is the same as that of the GE-PON.

In future, although it is considered that an ultra high definition video service, a ubiquitous service, and so on are required to have a large capacity of more than 10 Gbps class, when the bit rate of the transceiver is merely increased from 10 G class to 40/100 G class, there is a problem that the practical application is difficult due to an increase of cost required for system upgrade.

As a means for solving the above problem, there has been reported a wavelength tunable WDM/TDM-PON in which wavelength tunability is added to a transceiver in an OLT so that the number of the transceiver in an OLT can be increased in a stepwise manner, according to a bandwidth requirement, then time division multiplexing (TDM) and wavelength division multiplexing (WDM) techniques are combined effectively (for example, see Patent Literature 1 and Non-Patent Literature 1). However, a demand for economization is still under severe conditions. Thus, to fill the demand, it is considered that the solution is to connect more users are to a single OLT than the existing technique. Consequently, there can be expected improvement of network utilization efficiency due to a statistical multiplex effect and economical effects including that a device cost and power consumption can be reduced by making it possible to operating a relatively smaller number of the OLTs than the current technique.

Patent Literature 1: Japanese Patent Laid-Open Publication No. 2010-154063

Non-Patent Literature

Non-Patent Literature 1: Hirotaka NAKAMURA, et al., "λ-tunable WDM/TDM-PON using DWBA for flexible service upgrade", Proceedings of the Society Conference of IEICE 2010, September.

SUMMARY OF DISCLOSURE

In the above optical communication system, since an OLT (OLT: Optical Line Terminal) and an ONU (ONU: Optical Network Unit) can deliver a signal to a receiver in the OLT as intended only when a transmission wavelength is designated, a wavelength used for communication is required to be previously determined before communication between the OLT and the ONU. In the ONU, connection to a network can be notified to the OLT when the wavelength used for communication is determined. Thus, in the prior art, when the ONU is connected for the first time, a spectrum of an uplink signal is monitored from a monitoring port, a free wavelength is searched, and the transmission wavelength is required to be determined. Thus, in the prior art, a wavelength detection device such as an optical spectrum analyzer is required when the ONU is newly connected, and there is a problem that it is difficult to economize the ONU.

Thus, in order to solve the above problem, an object of the present disclosure is to provide a bandwidth allocation device, which can designate a transmission wavelength with a simple means when an ONU is newly connected to an optical communication system and can economize the ONU, and a bandwidth allocation method.

SUMMARY

A transmission wavelength is designated by layer 2 control with respect to a connected ONU, whereby communication is fully established although a device configuration is economical.

Specifically, a bandwidth allocation device according to the present disclosure is a bandwidth allocation device of a PON system which include an OLT having one or a plurality of OLT optical transceivers in which an optical transmitter transmitting a downlink signal and an optical receiver receiving an uplink signal make a pair, an ONU having one or a plurality of ONU optical transceivers in which an optical transmitter transmitting the uplink signal so that a wavelength of the uplink signal can be tuned and an optical receiver receiving the downlink signal make a pair, and an optical transmission path in which the number of ONU connection ends to which the ONU is connected is not less than the number of the ONUs and which connects the OLT and the ONU, the bandwidth allocation device including:

an OLT controller which makes each of the OLT optical transceivers transmit a search signal at a prescribed time so that the search signals reach all the ONU connection ends of the optical transmission path; and an ONU controller which, when the ONU connected to the ONU connection end of the optical transmission path is unregistered, tunes a wavelength of the optical transmitter of the ONU to a wavelength corresponding to the search signal when receiving the search signal and makes the optical transmitter transmit a response signal to the OLT.

A bandwidth allocation method according to the present disclosure is a bandwidth allocation method of a PON system, which includes an OLT having one or a plurality of OLT optical transceivers in which an optical transmitter transmitting a downlink signal and an optical receiver receiving an uplink signal make a pair, an ONU having one or a plurality of ONU transceivers in which an optical transmitter transmitting the uplink signal so that a wavelength of the uplink signal can be tuned and an optical receiver receiving the downlink signal make a pair, and an optical transmission path in which the number of ONU connection ends to which the ONU is connected is not less than the number of the ONUs and which connects the OLT and the ONU, the bandwidth allocation device, the bandwidth allocation method including:

a search signal transmission step of transmitting a search signal from each of the OLT optical transceivers at a prescribed time so that the search signals reach all the ONU connection ends of the optical transmission path; and a response signal transmission step of, when the ONU connected to the ONU connection end of the optical transmission path is unregistered, tuning a wavelength of an optical transmitter of the ONU to a wavelength corresponding to the search signal when receiving the search signal, and transmitting a response signal to the OLT.

In the bandwidth allocation device and the bandwidth allocation method, a search signal is periodically transmitted to all wavelengths that may be used, whereby detection of a newly connected ONU and designation of a signal wavelength are realized with simple functions. Accordingly, the bandwidth allocation device and a bandwidth allocation method, which can designate a transmission wavelength with simple means when the ONU is newly connected to an optical communication system and can economize the ONU.

In the bandwidth allocation device according to the present disclosure, the OLT controller may include, in the search signal, wavelength information of a wavelength set to the optical transmitter of the ONU which is unregistered, and the ONU controller may determine the wavelength of the optical transmitter of the ONU based on the wavelength information included in the search signal.

In the bandwidth allocation method according to the present disclosure, in the search signal transmission step, wavelength information of a wavelength set to an optical transmitter of the unregistered ONU is included in the search signal, and in the response signal transmission step, the wavelength of the optical transmitter of the ONU is determined based on the wavelength information included in the search signal.

In the bandwidth allocation device according to the present disclosure, the OLT controller may include, in the search signal, wavelength information of a wavelength of the search signal and identification information for identifying the optical transmitter of the OLT transmitting the search signal, and the ONU controller may have a correspondence table of the wavelength information and a wavelength set to the optical transmitter of the ONU with respect to the identification information and determine the wavelength of the optical transmitter of the ONU based on the wavelength information and the identification information included in the search signal.

In the bandwidth allocation method according to the present disclosure, in the search signal transmission step, wavelength information of a wavelength of the search signal and identification information for identifying an optical transmitter of the OLT transmitting the search signal are included in the search signal, and in the response signal transmission step, there is a correspondence table of the wavelength information and a wavelength set to the optical transmitter of the ONU with respect to the identification information, and the wavelength of the optical transmitter of the ONU is determined based on the wavelength information and the identification information included in the search signal.

In the bandwidth allocation device according to the present disclosure, the ONU has one or a plurality of ONU optical transceivers in which an optical transmitter transmitting the uplink signal so that a wavelength of the uplink signal can be tuned and an optical receiver receiving the downlink signal which is intended so that a reception wavelength can be changed make a pair, the OLT controller may include, in the search signal, wavelength information of a wavelength set to an optical transmitter of the unregistered ONU, and the ONU controller periodically may change a wavelength that can be received by a transceiver of the ONU, make the transceiver of the ONU receive the search signal when there is the search signal having the receivable wavelength, and determine a wavelength of an optical transmitter of the ONU based on the wavelength information included in the search signal.

In the bandwidth allocation method according to the present disclosure, the ONU has one or a plurality of ONU optical transceivers in which an optical transmitter transmitting the uplink signal so that a wavelength of the uplink signal can be tuned and an optical receiver receiving the downlink signal which is intended so that a reception wavelength can be tuned make a pair, in the search signal transmission step, wavelength information of a wavelength set to the optical transmitter of the unregistered ONU is included in the search signal, and in the response signal transmission step, a wavelength which can be received by a transceiver of the ONU is periodically changed, and when there is the search signal having a receivable wavelength, the search signal is received by the transceiver of the unregistered ONU, and the wavelength of the optical transmitter of the ONU is determined based on the wavelength information included in the search signal.

The OLT controller of the bandwidth allocation device according to the present disclosure make one or a plurality of the OLT optical transceivers transmit the search signal.

In the bandwidth allocation method according to the present disclosure, in the search signal transmission step, one or a plurality of the OLT optical transceivers transmit the search signal.

In the bandwidth allocation device according to the present disclosure, the wavelength information included in the search signal is a plurality of wavelengths, and the ONU controller determines one wavelength, randomly selected from a plurality of wavelengths of the wavelength information, as the wavelength of the optical transmitter of the ONU.

In the bandwidth allocation method according to the present disclosure, the wavelength information included in the search signal is a plurality of wavelengths, and in the response signal transmission step, one wavelength randomly selected from a plurality of wavelengths of the wavelength information is determined as the wavelength of the optical transmitter of the ONU.

In the bandwidth allocation device according to the present disclosure, the OLT controller includes, in the search signal, a reception wavelength of the OLT optical transceiver, intended to receive the response signal of the ONU, as the wavelength information.

In the bandwidth allocation method according to the present disclosure, in the search signal transmission step, a reception wavelength of the OLT optical transceiver intended to receive the response signal from the ONU is included as the wavelength information in the search signal.

In the bandwidth allocation device according to the present disclosure, the wavelength information included in the search signal is a plurality of weighted wavelengths associated with selection, and the ONU controller determines one wavelength, selected from a plurality of wavelengths of the wavelength information according to the weighting, as the wavelength of the optical transmitter of the ONU.

In the bandwidth allocation method according to present disclosure, the wavelength information included in the search signal is a plurality of weighted wavelengths associated with selection, and in the response signal transmission step, one wavelength selected from a plurality of wavelengths of the wavelength information according to the weighting is determined as the wavelength of the optical transmitter of the ONU.

Effects of the Disclosure

The present disclosure can provide a bandwidth allocation device and a bandwidth allocation method, which can designate a transmission wavelength with simple means when an ONU is newly connected to an optical communication system and can economize the ONU.

BRIEF DESCRIPTION OF THE DRAWINGS

FIG. 8 is a view showing a relation of the search signal, the input/output ports of a wavelength filter 30, and a wavelength in the bandwidth allocation device according to the present disclosure;

FIG. 9 is a view showing a relation of the search signal number and wavelength information included therein in the bandwidth allocation device according to the present disclosure;

FIG. 10 is a view showing a relation of information included in the search signal and information calculated in the ONU in the bandwidth allocation device according to the present disclosure;

FIG. 11 is a view showing a relation of the search signal, the input/output ports of the wavelength filter 30, and the wavelength in the bandwidth allocation device according to the present disclosure;

FIG. 12 is a view showing a relation of the search signal numbers and the wavelength information included therein in the bandwidth allocation device according to the present disclosure;

FIG. 13 is a view showing a relation of information included in the search signal and information calculated in the ONU in the bandwidth allocation device according to the present disclosure.

DETAILED DESCRIPTION OF THE PREFERRED EMBODIMENT

Embodiment 1

Figure 1:
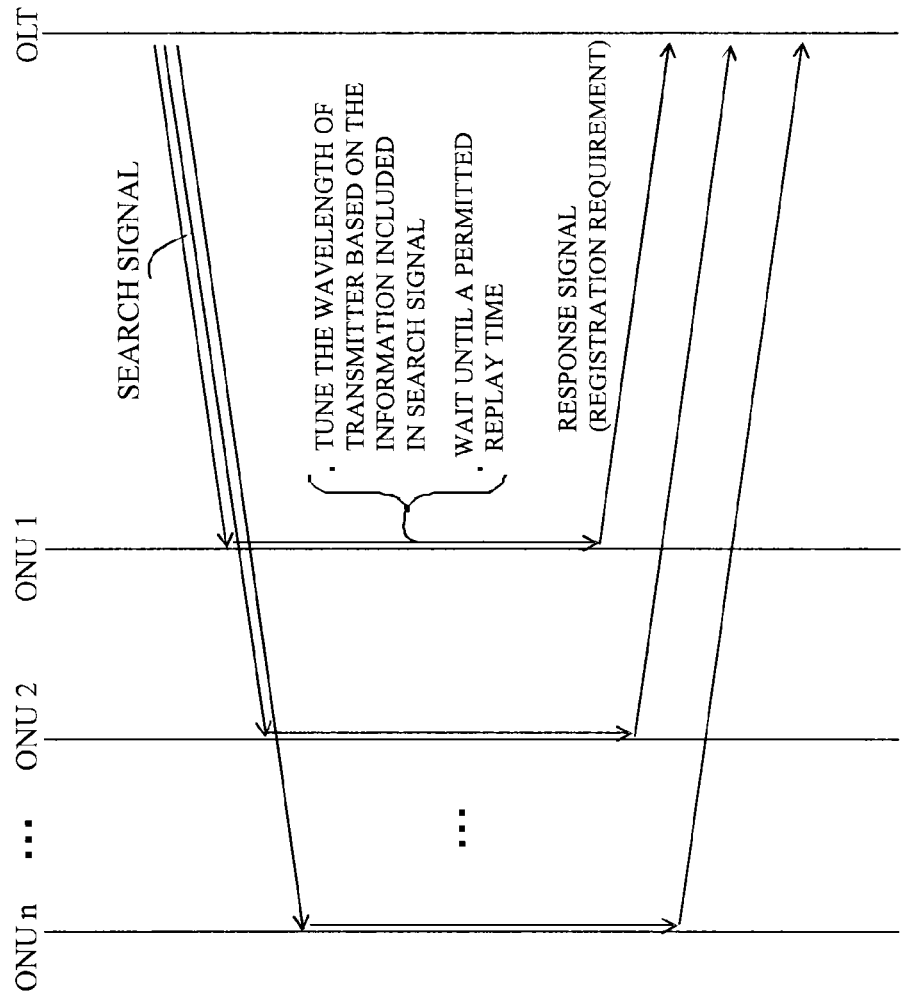
FIG. 1 is a view for explaining timings of a search signal which a bandwidth allocation device according to the present disclosure makes an OLT transmit and a response signal transmitted by an ONU.
Figure 2:
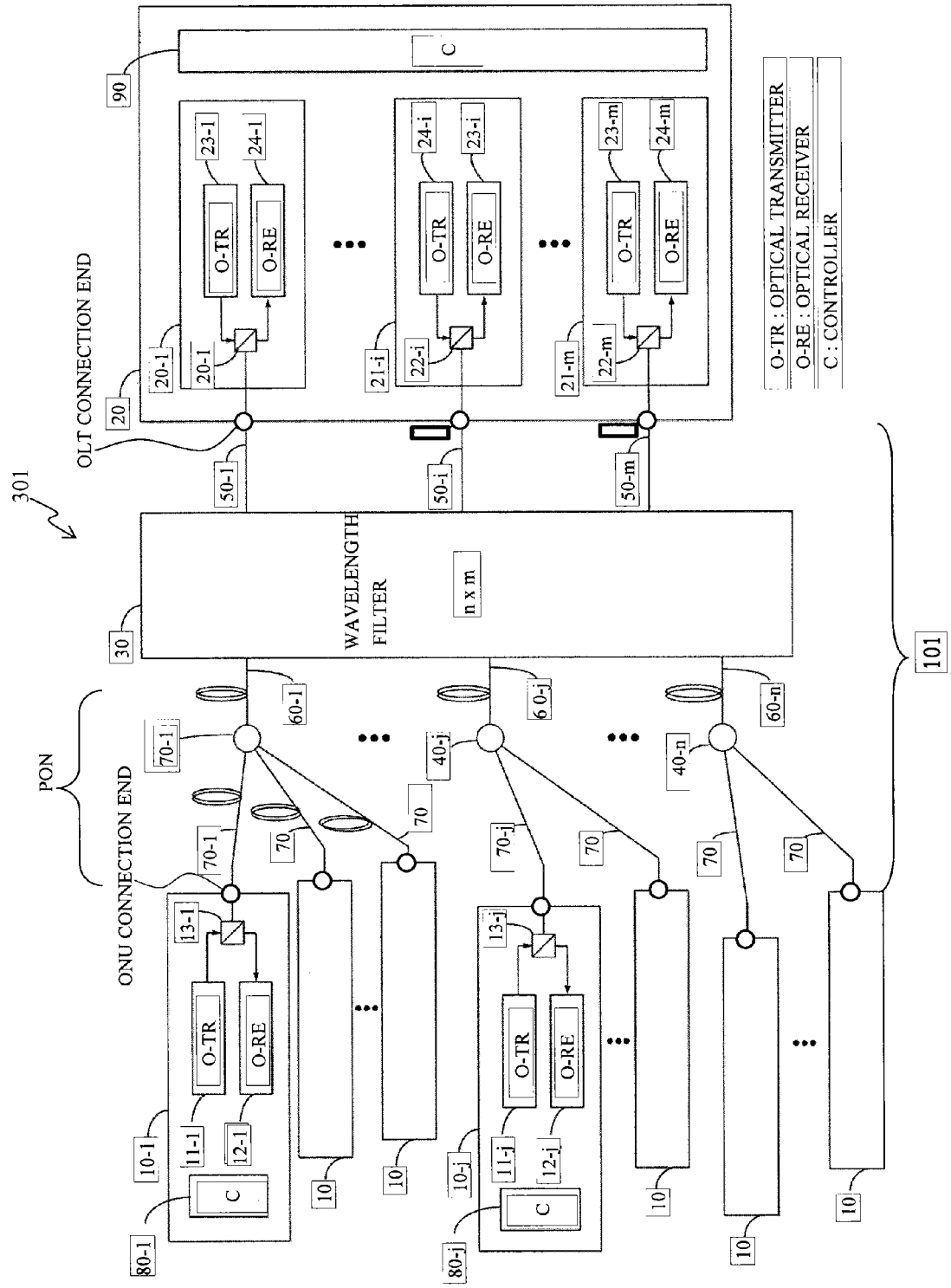
FIG. 2 is a view for explaining a configuration of an optical communication system controlled by the bandwidth allocation device according to the present disclosure; a configuration of an optical communication system

Cyclic Wavelength Filter Configuration, Response Wavelength is Designated by Search Signal FIG. 2 shows a configuration of an optical communication system 301 of this embodiment. The optical communication system 301 is constituted of ONUs 10 as user devices, an OLT 20 as a center device, a wavelength filter 30 having a cyclicity|[A1], an optical power splitter 40, optical fibers 50 connecting the OLT 20 with the wavelength filter 30, optical fibers 60 connecting the wavelength filter 30 with the optical power splitter 40 with a single fiber and optical fibers 70 connecting the optical power splitter 40 with the ONU 10 with a single fiber. In an ONU-side port of the wavelength filter 30, only one ONU may be directly connected not through the optical power splitter 40. The optical communication system 301 is a PON system in which time division multiplexing and wavelength division multiplexing are combined effectively.

An optical transmission path 101 is a section from the OLT 20 to the ONU 10. In the optical transmission path 101, an optical signal transmitted from the OLT 20 to the ONU 10 is a downlink signal, and an optical signal transmitted from the ONU 10 to the OLT 20 is an uplink signal. An end of the optical fiber 70 through which the ONU 10 is connected to the optical transmission path 101 is sometimes referred to as an ONU connection end, and an end of the optical fiber 50 through which each optical transceiver 21 of the OLT 20 is connected to the optical transmission path 101 is sometimes referred to as an OLT connection end.

The optical communication system 301 is provided with a bandwidth allocation device which allocates a transmission wavelength when the ONU 10 is newly connected to the optical transmission path 101. The bandwidth allocation device includes an OLT controller 90 and an ONU controller 80.

The OLT 20 includes one or a plurality of optical transceivers 21 and the OLT controller 90. The optical transceivers 21 includes an optical transmitter 23 transmitting the downlink signal, an optical receiver 24 receiving the uplink signal, and a wavelength multiplexer/demultiplexer 22 constituted of a wavelength filter multiplexing and demultiplexing a downlink optical signal and an uplink optical signal. The wavelength of the output optical signal of an optical transmitter 23-$i$ (1≤$i$≤m, i and m are natural numbers) in an optical transceiver 21-$i$ is $\lambda$d$i$. The optical transmitter 23 can tune the output wavelength between $\lambda$d1 and $\lambda$dn. The optical transceiver 21-$i$ is sometimes expressed as "Line Card (LC)" or "OLT Port".

The ONU 10 includes an optical transmitter 11 transmitting the uplink signal, an optical receiver 12 receiving the downlink signal, a wavelength multiplexer/demultiplexer 13 constituted of a wavelength filter multiplexing and demultiplexing the uplink optical signal and the downlink optical signal, and the ONU controller 80. The optical transmitter 11 can tune the output wavelength between $\lambda$u1 and $\lambda$um.

Figure 3:
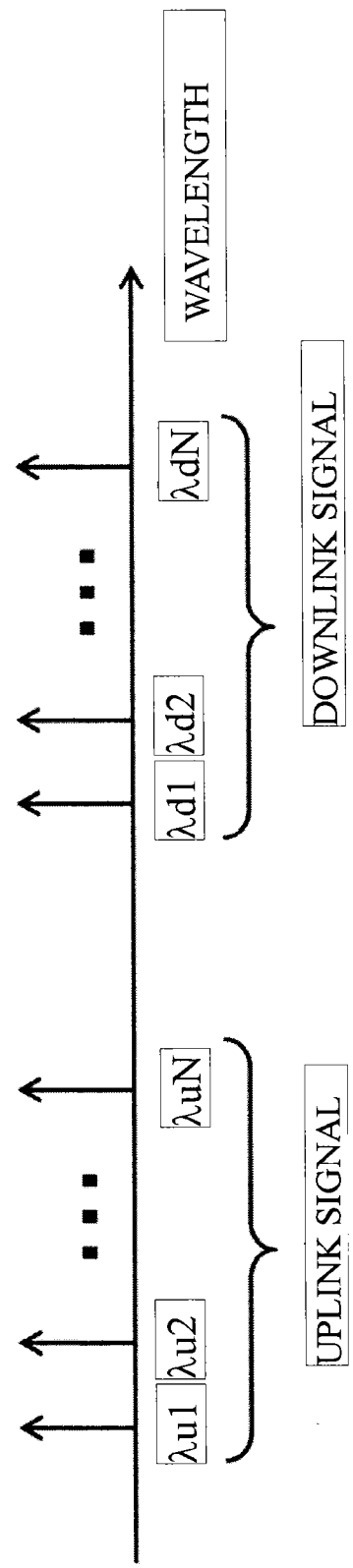
FIG. 3 is a view showing wavelength arrangement of an uplink signal and a downlink signal in the optical communication system.

FIG. 3 shows an example of wavelength arrangement of the downlink signal and the uplink signal. In this example, although the wavelength band of the uplink signal is arranged on a shorter wavelength side than the wavelength band of the downlink signal, the wavelength band of the downlink signal may be arranged on a shorter wavelength side than the wavelength band of the uplink signal, or the wavelength bands of the uplink signal and the downlink signal may overlap with each other.

Figure 4:
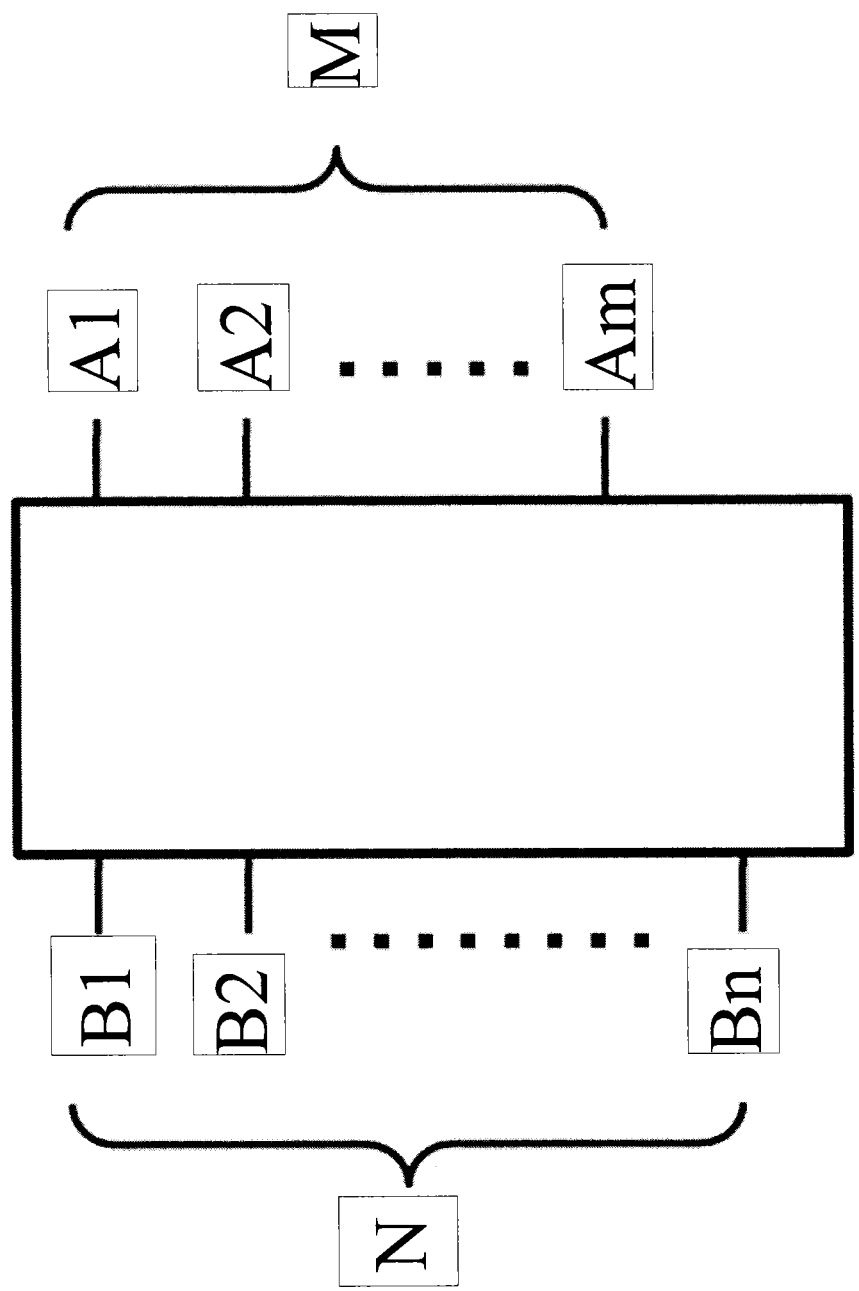
FIG. 4 is a view showing input/output ports of a wavelength filter of an optical transmission path of the optical communication system.

The wavelength filter 30 has OLT ports A1 to Am and ONU-side ports B1 to Bn (m and n are integers, and n≥m). FIG. 4 is a view for explaining input/output ports of the wavelength filter 30. A relation of the input/output port of the wavelength filter 30 and an input/output wavelength has a cyclicity as shown in FIG. 8. The ONUs 10 or a group of the ONUs 10 connected to the ONU-side ports B1 to Bn of the wavelength filter 30 are referred to as PON-1 to PON-n for convenience sake.

A flow of the downlink signal in the optical communication system 301 will be described.

As an example thereof, a flow of the downlink signal from the optical transceiver 21-$i$ in the OLT 20 to the ONU 10-$j$ will be described.

The downlink signal of a wavelength $\lambda$p (1≤p≤m, p is an integer) transmitted from the optical transmitter 23-$i$ in the optical transceiver 21-$i$ (1≤$i$≤m, i is an integer) in the OLT 20 is input to an OLT port A$i$ of the wavelength filter 30 through a wavelength multiplexer/demultiplexer 22-$i$ and an optical fiber 50-$i$. The downlink signal input to A$i$ is output to an ONU-side port B$j$ (1≤$j$≤n, j is an integer) in accordance with a correspondence table of the wavelength and the ports shown in FIG. 8. The downlink signal output from the B$j$ reaches an optical power splitter 40-$j$ through an optical fiber 60-$j$. In the optical power splitter 40-$j$, the downlink signal is distributed to equally reach all the ONUs belonging to a downstream of the optical power splitter, that is, PON-$j$. The downlink signal is input to the ONU 10-$j$ through an optical fiber 70-$j$ and reaches an optical receiver 12-$j$ through a wavelength filter 13-$j$ in the ONU.

A flow of the uplink signal in the optical communication system 301 will be described.

As an example thereof, a flow of the uplink signal from the ONU 10-$j$ (1≤$j$≤n, j is an integer) to the optical transceiver 21-$i$ in the OLT (1≤$i$≤m, i is an integer) will be described.

The uplink signal of a wavelength $\lambda$q (1≤q≤n, q is an integer) transmitted from an optical transmitter 11-$j$ in the ONU 10-$j$ (1≤$j$≤n, j is an integer) is input to the ONU-side port B$j$ of the wavelength filter 30 through the wavelength multiplexer/demultiplexer 13-$j$, the optical fiber 70-$j$, the optical power splitter 40-$j$ and the optical fiber 60-$j$. The uplink signal input to B$j$ is passively output to the OLT port A$i$ (1≤$i$≤m, i is an integer) in accordance with the correspondence table of the wavelength and the ports shown in FIG. 8. The uplink signal output from A$i$ passes through the optical fiber 50-$i$ and reaches an optical receiver 24-$i$ through the wavelength multiplexer/demultiplexer 22-$i$ in the optical transceiver 21-$i$ in the OLT 20.

Next, a means for detecting the newly connected ONU 10 to the optical communication system 301 of this embodiment will be described.

The OLT controller 90 makes each of the optical transceivers 21 transmit a search signal (Discovery Gate) at a prescribed time so that the search signals reach all the subscribed connection ends of the optical transmission path 101. In the ONU controller 80, when the ONU 10 connected to the ONU connection end of the optical transmission path 101 is unregistered, the optical transmitter 11 of the ONU 10 is tuned to a wavelength corresponding to the search signal when receiving the search signal, and the response signal (Registration Request) is transmitted to the OLT 20. The prescribed time when the search signal is transmitted may be periodic or may be a time when the ONU 10 is newly connected.

There are two means for tuning a wavelength of the optical transmitter 11 of the ONU 10 to a wavelength corresponding to the search signal. This embodiment employs a first means. The OLT controller 90 includes wavelength information of the wavelength, set to the optical transmitter 11 of the ONU 10 which is unregistered, in the search signal, and the ONU controller 80 determines the wavelength of the optical transmitter 11 of the ONU 10 based on the wavelength information included in the search signal.

Hereinafter, the first means will be described specifically. The search signal used for detecting the unregistered ONU 10 periodically or as needed is transmitted from an optical transceiver 21-1 of the OLT 20.

The optical transceiver 21-1 transmits search signals S1-1 to S1-$n$ in accordance with the correspondence table shown in FIG. 8 held by the OLT controller 90 so that the search signals reach all the ONU ports B1 to Bn of the wavelength filter 30. Namely, the OLT controller 90 makes the OLT optical transceiver 21 transmit the search signals so that the search signals reach all the ONU connection ends of the optical transmission path 101.

When the ONU 10 transmits a signal to the specific optical receiver 24 of the OLT 20, the wavelength filter 30 has the cyclicity, and therefore, the wavelength to be output is different according to what the ONU 10 is connected to which of the ONU-side ports of the wavelength filter 30 (what the ONU 10 is connected to which of the ONU connection ends of the optical transmission path 101).

Thus, as shown in a correspondence table of FIG. 9, the OLT controller 90 includes, in the search signal, information designating a wavelength for each destination PON (1 to n) to be used when the unregistered ONU 10 responses to the search signal.

The unregistered ONU 10 having received the search signal tunes an output wavelength to the wavelength designated by the information included in the search signal and transmits the response signal to the OLT 20. In this example, the unregistered ONU 10 tunes the wavelength of the response signal to $\lambda$u1.

The transmitted response signal is output to an OLT port A1 in the wavelength filter 30 and reaches the optical transceiver 21-1 through an optical fiber 50-1. The response signal is output toward an optical receiver 24-1 by a wavelength multiplexer/demultiplexer 22-1 and received by the optical receiver 24-1. Accordingly, the OLT 20 can detect that the unregistered ONU 10 has been connected and can register the ONU 10. For example, the OLT 20 notifies the ONU 10 of the completion of the registration with a Register signal including LLID (Logical Link. ID).

By virtue of the first means as described above, the optical communication system 301 can realize the detection of a newly connected ONU and the registration of the ONU in the OLT.

In this embodiment, although there has been described the example in which the optical transceiver 21-1 transmits the search signal and receives the response signal with respect to the search signal, the same holds for the case where this disclosure is carried out in other optical transceiver 21-$i$ (1≤i≤m, i is an integer). Namely, in the optical communication system 301, a similar operation can be realized by referring to each row of the correspondence tables of FIGS. 8 and 9 corresponding to the port Ai (the OLT connection end of the optical transmission path 101) of the wavelength filter 30 to which the optical transceiver 21-$i$ is connected.

Further, the same holds for the case where the optical transceiver 21 transmitting the search signal and the optical transceiver 21 receiving the response signal are different from each other. Namely, in the optical communication system 301, a similar operation can be realized by referring to each corresponding row of the correspondence tables of FIGS. 8 and 9, according to the ports (A1 to Am) (the OLT connection ends of the optical transmission path 101) of the wavelength filter 30 to which those optical transceivers 21 are connected.

Embodiment 2

Wavelength Information of Search Signal Itself and Port Information are Included in the Search Signal The configuration of this embodiment is the same as that of the optical communication system 301 of FIG. 2. Flows of an uplink signal and a downlink signal in an OLT 20 and an ONU 10 are similar to those in the optical communication system 301.

In the optical communication system 301 of this embodiment, a means for detecting the ONU 10 which is newly connected will be described.

This embodiment is the same as Embodiment 1 in that an OLT controller 90 transmits a search signal at a prescribed time, and an ONU controller 80 tunes a wavelength of an optical transmitter 11 to a wavelength corresponding to the search signal and makes the optical transmitter 11 transmit a response signal to the OLT 20.

Among the two means for tuning a wavelength of the optical transmitter 11 of the ONU 10 to a wavelength corresponding to the search signal, this embodiment employs a second means. The OLT controller 90 includes, in the search signal, wavelength information of the wavelength of the search signal and identification information used for identifying an optical transmitter 21 of the OLT 20 transmitting the search signal, and the ONU controller 80 has a correspondence table of the wavelength information and the wavelength set to the optical transmitter 11 of the ONU 10 with respect to the identification information and determines the wavelength of the optical transmitter 11 of the ONU 10 based on the wavelength information and the identification information included in the search signal.

Hereinafter, the second means will be described specifically. The search signals (S1-1 to S1-$n$) following the correspondence table shown in FIG. 8 are transmitted from an optical transceiver 21-1 of the OLT 20 for the purpose of detecting the unregistered ONU 10 periodically or as needed. The ONU 10 determines the wavelength of the response signal to the optical transceiver 21-1 in consideration of the cyclicity of the wavelength filter 30.

In the second means, the search signal includes "information of the wavelength of the search signal itself" and information of an OLT port "A1" of the wavelength filter 30 to which the optical transceiver 21-1 is connected. The information of the OLT port "A1" is the information of an OLT connection end of an optical transmission path 101 to which the optical transceiver 21-1 is connected.

The unregistered ONU 10 having received the search signal calculates a PON number (1 to n) to which the ONU 10 belongs and the wavelength used for sending a signal to the optical transceiver 21-1, as shown in FIG. 10, from the information included in the search signal and the correspondence table of FIG. 8 held by an ONU controller 80-1. The unregistered ONU 10 then tunes an output wavelength of an optical transmitter 11-1 to the calculated wavelength and transmits the response signal to the OLT 20. In this example, the unregistered ONU 10 tunes the wavelength of the response signal to $\lambda u1$.

The transmitted response signal reaches the optical transceiver 21-1 as described in Embodiment 1 and is received by an optical receiver 24-1. Accordingly, the OLT 20 can detect the unregistered ONU 10 has been connected and can register the ONU 10.

By virtue of the second means as described above, the optical communication system 301 can fully realize the detection of a newly connected ONU and the registration of the ONU in the OLT.

In this embodiment, although there has been described the example in which the optical transceiver 21-1 transmits the search signal and receives the response signal with respect to the search signal, the same holds for the case where this disclosure is carried out in other optical transceiver 21-$i$ (1≤i≤m, i is an integer). Namely, in the optical communication system 301, a similar operation can be realized by referring to each row of the correspondence tables of FIGS. 8 and 10 corresponding to the port Ai to which the optical transceiver 21-$i$ is connected (the OLT connection end to which an optical fiber 50-$i$ of the optical transmission path 101 and the optical transceiver 21-$i$ are connected).

Further, the same holds for the case where the optical transceiver 21 transmitting the search signal and the optical transceiver 21 receiving the response signal are different from each other. Namely, in the optical communication system 301, a similar operation can be realized by rewriting corresponding rows of the correspondence tables of FIGS. 8 and 10, according to the ports (A1 to Am) to which those optical transceivers 21 are connected or the periodicity of the OLT connection end and the cyclicity of the wavelength filter 30.

Embodiment 3

Figure 5:
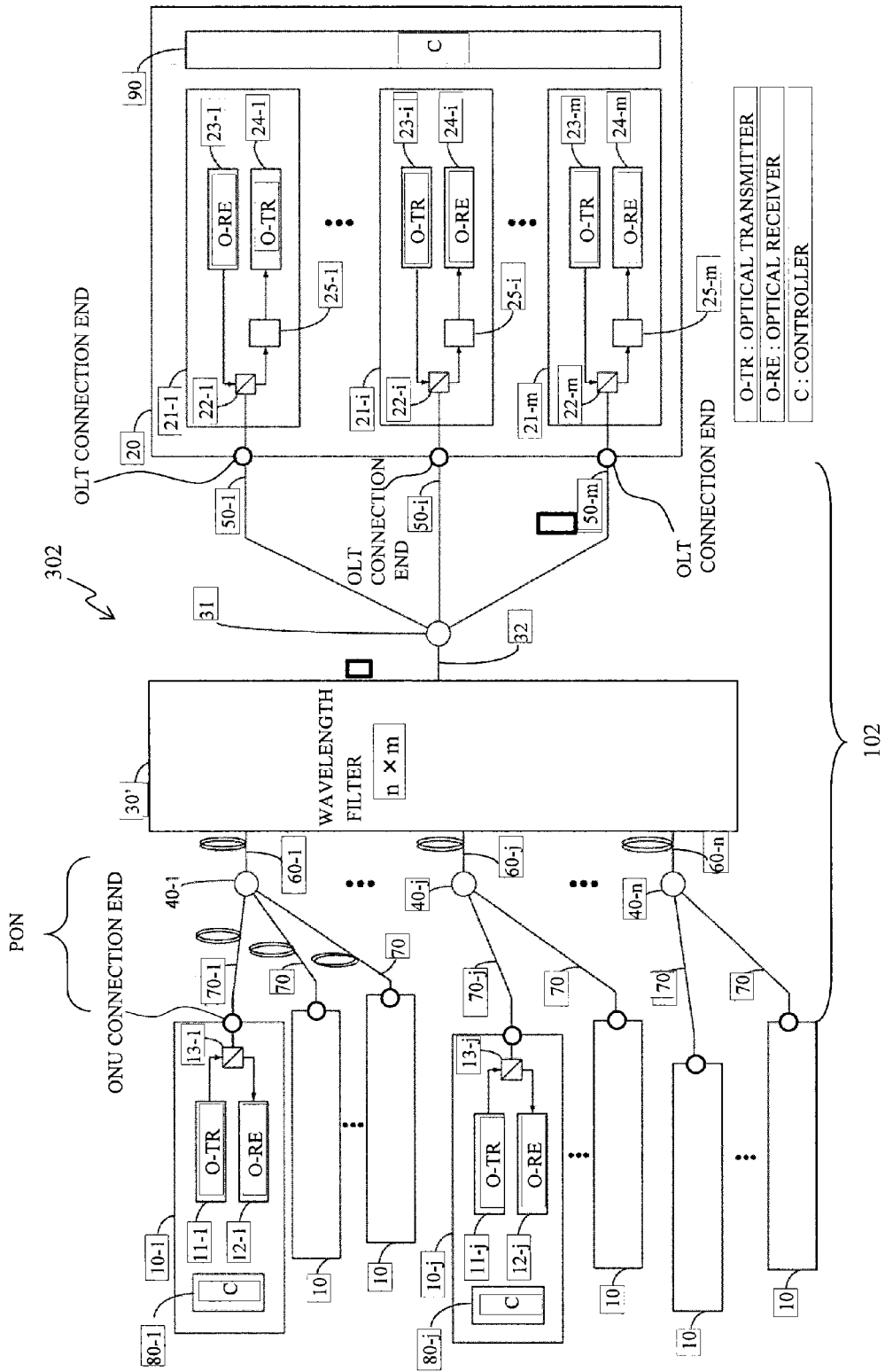
FIG. 5 is a view for explaining a configuration of the optical communication system controlled by the bandwidth allocation device according to the present disclosure.

1×n AWG Branch Configuration, Direct Designation of Response Wavelength with Search Signal FIG. 5 shows a configuration of an optical communication system 302 of Embodiment 3. The optical communication system 302 is constituted of ONUs 10 as user devices, an OLT 20 as a center device, an optical power splitter 31, a wavelength filter 30', an optical fiber 32 connecting the optical power splitter 31 and the wavelength filter 30', an optical power splitter 40, a plurality of optical fibers 50 connecting the OLT 20 and the wavelength filter 30', a plurality of optical fibers 60 connecting the wavelength filter 30' with the optical power splitter 40 with one fiber, and a plurality of optical fibers 70 connecting the optical power splitter 40 with the ONU 10 with one fiber. In an ONU-side port of the wavelength filter 30', only one ONU may be connected not through the optical power splitter 40. The optical communication system 302 is a PON system in which the time division multiplexing and the wavelength division multiplexing are combined effectively. An optical transmission path 102 is a section from the OLT 20 to the ONU 10.

The optical communication system 302 is provided with a bandwidth allocation device which allocates a transmission wavelength when the ONU 10 is newly connected to the optical transmission path 102. The bandwidth allocation device includes the OLT controller 90 and the ONU controller 80.

The OLT 20 includes one or a plurality of optical transceivers 21 and the OLT controller 90. In comparison with the optical transceiver 21 of FIG. 2, the optical transceiver 21 of this embodiment further includes a wavelength tunable filter 25 used for selecting a wavelength to be received from an uplink signal. An output wavelength of an optical transmitter 23-$i$ in an optical transceiver 21-$i$ (1≤$i$≤m, and m are natural numbers) is represented by $\lambda$d$i$. The optical transmitter 23 can tune the output wavelength between $\lambda$d1 and $\lambda$dn. The transmission wavelength of a wavelength tunable filter 25-$i$ in the optical transceiver 21-$i$ is represented by $\lambda$u$i$. The wavelength tunable filter 25 can tune the transmission wavelength from $\lambda$u1 to $\lambda$un.

The configuration of the ONU 10 is similar to the configuration of the ONU 10 described in FIG. 2.

The wavelength arrangement of the downlink signal and the uplink signal in the optical communication system 302 is similar to the example in the optical communication system 301 of FIG. 3.

Figure 6:
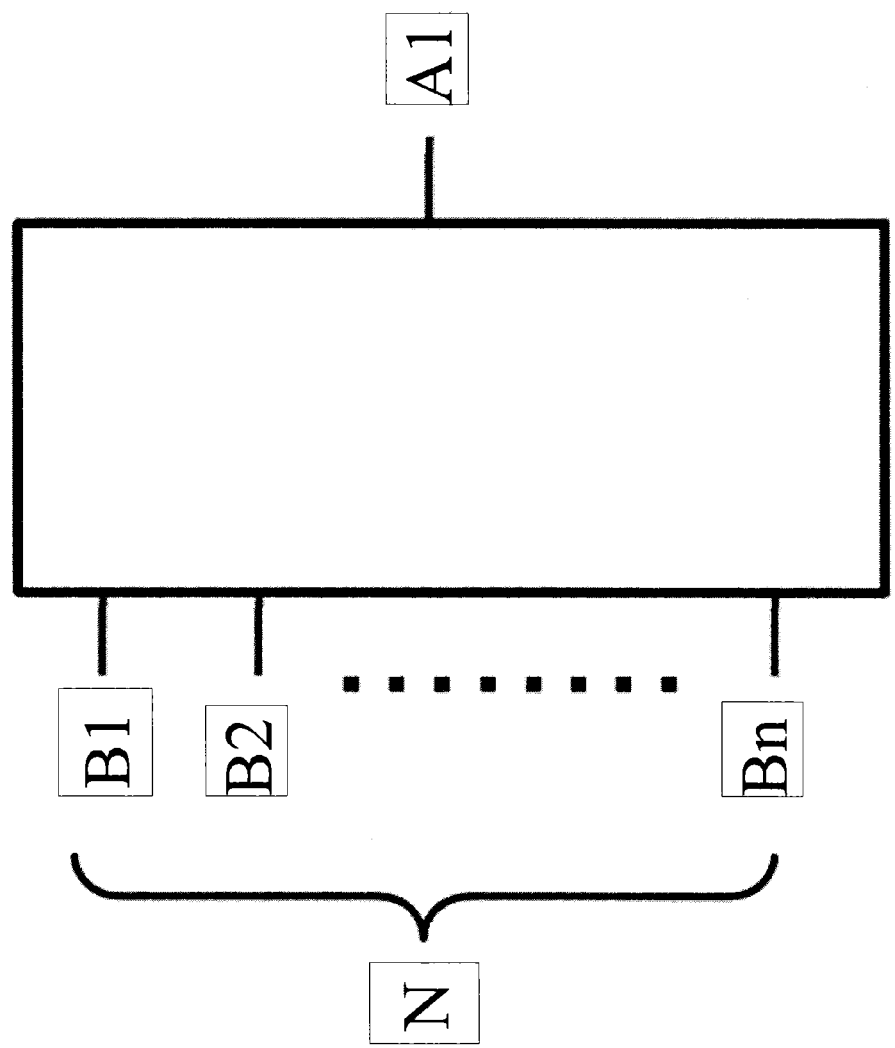
FIG. 6 is a view showing the input/output ports of the wavelength filter of the optical transmission path of the optical communication system.

The wavelength filter 30' has an OLT port A1 and ONU-side ports B1 to Bn (n is a natural number). FIG. 6 is a view for explaining an input/output port of the wavelength filter 30'. FIG. 11 is a view for explaining a relation of the input/output ports of the wavelength filter 30' and input/output wavelengths. The ONUs 10 or a group of the ONUs 10 connected to the ONU-side ports B1 to Bn of the wavelength filter 30' are respectively referred to as PON-1 to PON-n for convenience sake.

A flow of the downlink signal in the optical communication system 302 will be described.

As an example thereof, a flow of the downlink signal from the optical transceiver 21-$i$ in the OLT 20 to the ONU 10-$j$ will be described.

The downlink signal of a wavelength $\lambda p$ (1≤$p$≤n, p is an integer) transmitted from the optical transmitter 23-$i$ in the optical transceiver 21-$i$ (1≤$i$≤m, i is an integer) in the OLT 20 is input to the OLT port A1 of the wavelength filter 30' through a wavelength multiplexer/demultiplexer 22-$i$, an optical fiber 50-$i$, the optical power splitter 31, and the optical fiber 32. The downlink signal input to A1 is output to the ONU-side port Bj (1≤$j$≤n, j is an integer) in accordance with the correspondence table of the wavelengths and the ports shown in FIG. 8. The downlink signal output from Bj reaches an optical power splitter 40-$j$ through an optical fiber 60-$j$. In the optical power splitter 40-$j$, the downlink signal is distributed to equally reach all the ONUs belonging to a downstream side of the optical power splitter, that is, PON-j. The downlink signal is input to an ONU 10-$j$ through an optical fiber 70-$j$ and reaches an optical receiver 12-$j$ through a wavelength multiplexer/demultiplexer 13-$j$ in the ONU.

A flow of the uplink signal in the optical communication system 302 will be described.

As an example thereof, a flow of the uplink signal from the ONU 10-$j$ (1≤$j$≤n, j is an integer) to the optical transceiver 21-$i$ in the OLT (1≤$i$≤m, i is an integer) will be described.

The uplink signal of a wavelength $\lambda q$ (1≤$q$≤n, q is an integer) transmitted from an optical transmitter 11-$j$ in the ONU 10-$j$ is input to the ONU-side port Bj of the wavelength filter 30' through the wavelength multiplexer/demultiplexer 13-$j$, an optical fiber 70-$j$, the optical power splitter 40-$j$ and the optical fiber 60-$j$. The uplink signal input to Bj is passively output to the OLT port A1. The uplink signal output from A1 reaches the optical power splitter 31 via the optical fiber 32 and is equally distributed to optical fibers 50-1 to 50-$m$. Among the uplink signals, the uplink signal distributed to the optical fiber 50-$i$ reaches an optical receiver 24-$i$ through the wavelength multiplexer/demultiplexer 22-$i$ in the optical transceiver 21-$i$ in the OLT and the wavelength tunable filter 25-$i$. At this time, it is assumed that the wavelength tunable filter 25-$i$ tunes the transmission wavelength to $\lambda q$ in accordance with an instruction from the OLT controller 90.

Next, a means for detecting the ONU 10 to which is newly connected to the optical communication system 302 of this embodiment will be described.

This embodiment is the same as Embodiment 1 in that the OLT controller 90 transmits the search signal at a prescribed time, and the ONU controller 80 tunes a wavelength of an optical transmitter 11 to a wavelength corresponding to the search signal and makes the optical transmitter 11 transmit a response signal to the OLT 20.

There are two means for tuning a wavelength of the optical transmitter 11 of the ONU 10 to a wavelength corresponding to the search signal. This embodiment employs a first means. The OLT controller 90 includes wavelength information of the wavelength, set to the optical transmitter 11 of the unregistered ONU 10, in the search signal, and the ONU controller 80 determines the wavelength of the optical transmitter 11 of the ONU 10 based on the wavelength information included in the search signal.

Hereinafter, the first means will be described specifically. The search signal used for detecting the unregistered ONU 10 periodically or as needed is transmitted from the optical transceiver 21-1 of the OLT 20.

The optical transceiver 21-1 transmits search signals S1-1 to S1-$n$ in accordance with a correspondence table shown in FIG. 12 held by the OLT controller 90 so that the search signals reach all the ONU ports B1 to Bn of the wavelength filter 30'. Namely, the OLT controller 90 makes the OLT optical transceiver 21 transmit the search signals so that the search signals reach all the ONU connection ends of the optical transmission path 102.

When the ONU 10 transmits a signal to the specific optical receiver 24 of the OLT 20, the wavelength to be output is different according to what the ONU 10 is connected to which of the ONU-side ports of the wavelength filter 30' (what the ONU 10 is connected to which of ONU connection ends of the optical transmission path 102).

Thus, as shown in the correspondence table of FIG. 12, the OLT controller 90 includes, in the search signal, information designating a wavelength for each destination PON (1 to n) to be used when the unregistered ONU 10 responses.

The unregistered ONU 10 having received the search signal tuned an output wavelength to the wavelength designated by the information included in the search signal and transmits the response signal to the OLT 20. In this example, the unregistered ONU 10 tunes the wavelength of the response signal to $\lambda$u1.

The OLT controller 90 controls a wavelength tunable filter 25-1 based on the table of FIG. 11 to tunes the transmission wavelength so that the response signal of the wavelength $\lambda$1 can be received.

The transmitted response signal is output to the OLT port A1 in the wavelength filter 30' and reaches all the optical transceivers 21 through all the optical fibers 50. The response signal is output toward the optical receiver 24 by a wavelength multiplexer/demultiplexer 22. Since each transmission wavelength of wavelength tunable filters (25-2 to 25-*m*) is different from the wavelength of the response signal, the response signal is interrupted by the wavelength tunable filters (25-2 to 25-*m*). The response signal can transmit through only the wavelength tunable filter 25-1 and is received by an optical receiver 24-1. Accordingly, the OLT 20 can detect that the unregistered ONU 10 has been connected and can register the ONU 10.

By virtue of the first means as described above, the optical communication system 302 can fully realize the detection of a newly connected ONU and the registration of the ONU in the OLT.

In this embodiment, although there has been described the example in which the optical transceiver 21-1 transmits the search signal and receives the response signal with respect to the search signal, the same holds for the case where this disclosure is carried out in other optical transceiver 21-*i* (1≤*i*≤m, i is an integer). Namely, in the optical communication system 302, a similar operation can be realized by referring to each row of the correspondence tables of FIGS. 11 and 12 because all the ports to which the optical transceivers 21-*i* are connected are A1.

Further, the same holds for the case where the optical transceiver 21 transmitting the search signal and the optical transceiver 21 receiving the response signal are different from each other. Namely, in the optical communication system 302, a similar operation can be realized by rewriting corresponding rows of FIGS. 11 and 12 since all the optical transceivers 21 are connected to the port A1.

Embodiment 4

1×n AWG Branch Configuration, Wavelength and Port Information are Included in Search Signal The configuration of this embodiment is the same as that of the optical communication system 302 of FIG. 5. Flows of an uplink signal and a downlink signal in the OLT 20 and the ONU 10 are similar to those in the optical communication system 302.

A means for detecting the ONU 10 to which is newly connected to the optical communication system 302 of this embodiment will be described.

This embodiment is the same as Embodiment 1 in that the OLT controller 90 transmits a search signal at a prescribed time, and the ONU controller 80 tunes a wavelength of an optical transmitter 11 to a wavelength corresponding to the search signal and makes the optical transmitter 11 transmit a response signal to the OLT 20.

Among the two means for tuning the wavelength of the optical transmitter 11 of the ONU 10 to a wavelength corresponding to the search signal, this embodiment employs a second means. The OLT controller 90 includes, in the search signal, wavelength information of the wavelength of the search signal and identification information used for identifying an optical transmitter 21 of the OLT 20 transmitting the search signal, and the ONU controller 80 has a correspondence table of the wavelength information and the wavelength set to the optical transmitter 11 of the ONU 10 with respect to the identification information and determines the wavelength of the optical transmitter 11 of the ONU 10 based on the wavelength information and the identification information included in the search signal.

Hereinafter, the second means will be described specifically. The search signals (S1-1 to S1-*n*) following the correspondence table shown in FIG. 11 are transmitted from an optical transceiver 21-1 of the OLT 20 for the purpose of detecting the unregistered ONU 10 periodically or as needed. The ONU 10 determines the wavelength of the response signal to the optical transceiver 21-1 in consideration of the ONU-side port of the wavelength filter 30'.

In the second means, the search signal includes "information of the wavelength of the search signal itself" and information of the OLT port "A1" of the wavelength filter 30' to which the optical transceiver 21-1 is connected. In the optical communication system, 302, since the OLT port "A1" is the same even when the OLT connection ends are different, the information of the OLT port may not be included in the search signal.

The unregistered ONU 10 having received the search signal calculates a PON number (1 to n) to which the ONU 10 belongs and the wavelength used for sending a signal to the OLT 20, as shown in FIG. 13, from the information included in the search signal and the correspondence table of FIG. 11 held by an ONU controller 80-1. The unregistered ONU 10 then tunes an output wavelength of an optical transmitter 11-1 to the calculated wavelength and transmits the response signal to the OLT 20. In this example, the unregistered ONU 10 tunes the wavelength of the response signal to λu1.

The OLT controller 90 controls a wavelength tunable filter 25-1 based on the table of FIG. 11 to set the transmission wavelength so that the response signal of the wavelength λ1 can be received.

The transmitted response signal can be transmitted through only the wavelength tunable filter 25-1, as described in Embodiment 3, and is received by the optical receiver 24-1. Accordingly, the OLT 20 can detect that the unregistered ONU 10 has been connected and can register the ONU 10.

By virtue of the second means as described above, the optical communication system 302 can fully realize the detection of a newly connected ONU and the registration of the ONU in the OLT.

In this embodiment, although there has been described the example in which the optical transceiver 21-1 transmits the search signal and receives the response signal with respect to the search signal, the same holds for the case where this disclosure is carried out in other optical transceiver 21-*i* (1≤*i*≤m, i is an integer) in the OLT. Namely, in the optical communication system 302, a similar operation can be realized by referring to rows of the correspondence tables of FIGS. 11 and 12 because all the ports to which the optical transceivers 21-*i* are connected are A1.

Further, the same holds for the case where the optical transceiver 21 transmitting the search signal and the optical transceiver 21 receiving the response signal are different from each other. Namely, the OLT controller 90 controls the wavelength tunable filter in the transceiver in the single OLT intended to receive the response signal so that the wavelength tunable filter tunes the transmission wavelength, whereby a similar operation can be realized.

Embodiment 5

Figure 7:
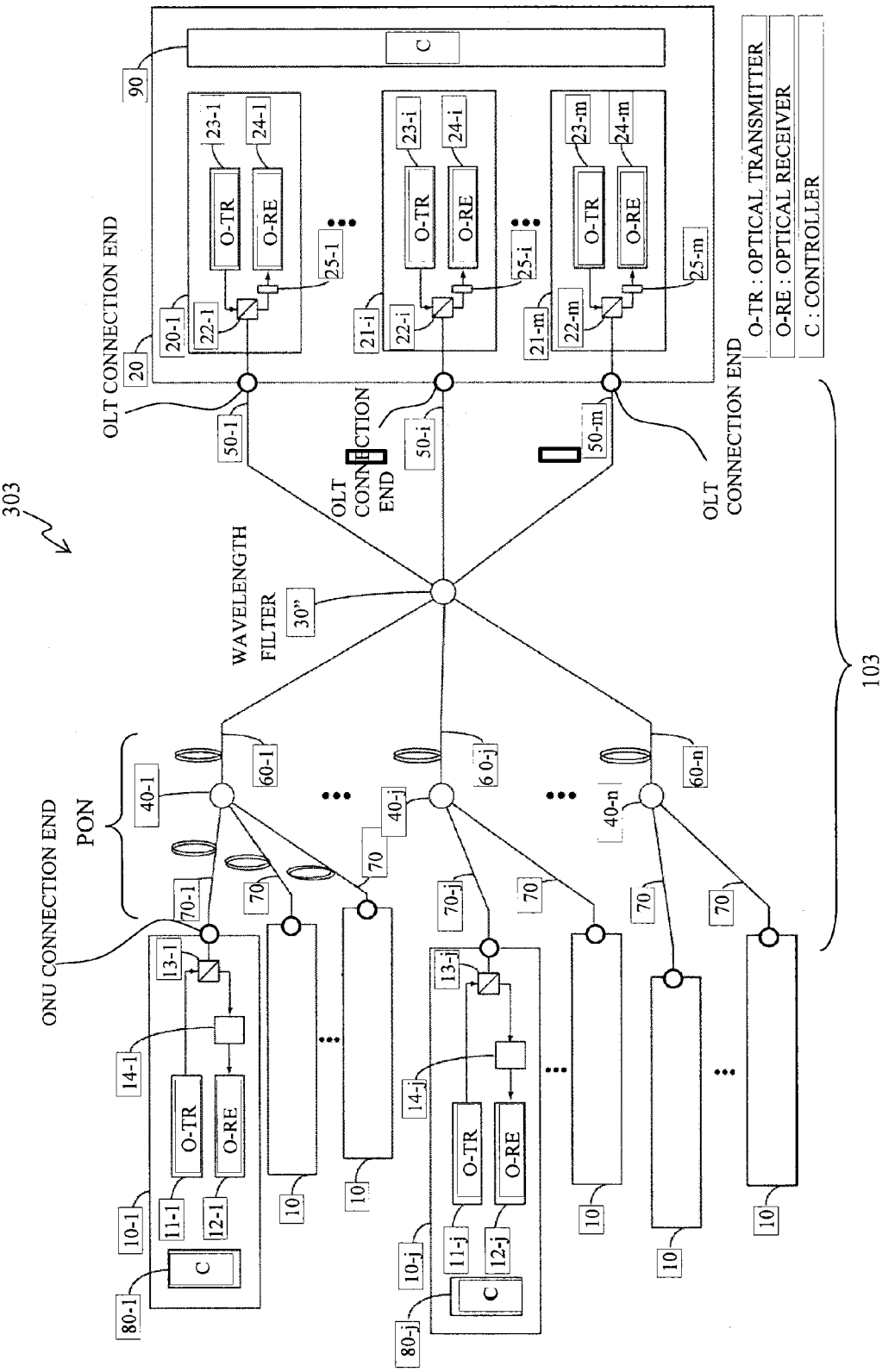
FIG. 7 is a view for explaining a configuration of the optical communication system controlled by the bandwidth allocation device according to the present disclosure.

PS Branch Configuration, Direct Designation of Response Wavelength with Single Search Signal FIG. 7 shows a configuration of an optical communication system 303 of Embodiment 5. The optical communication system 303 includes ONUs 10 as user devices, an OLT 20 as a center device, an optical power splitter 30'', a plurality of optical fibers 50 connecting the OLT 20 and the optical power splitter 30'', an optical power splitter 40, a plurality of optical fibers 60 connecting the optical power splitter 30'' with the optical power splitter 40 with one fiber, and a plurality of optical fibers 70 connecting the optical power splitter 40 with the ONU 10 with one fiber. In the ONU-side port of the optical power splitter 30'', only one ONU may be connected not through the optical power splitter 40. The optical communication system 303 is a PON system in which the time division multiplexing and the wavelength division multiplexing are combined effectively. An optical transmission path 103 is a section from the OLT 20 to the ONU 10.

The optical communication system 303 is provided with a bandwidth allocation device which allocates a transmission wavelength when the ONU 10 is newly connected to the optical transmission path 103. The bandwidth allocation device includes the OLT controller 90 and the ONU controller 80.

The OLT 20 includes one or a plurality of optical transceivers 21 and the OLT controller 90. The optical transceiver 21 has a configuration similar to the configuration of the optical transceiver 21 described in FIG. 5.

In comparison with the ONU 10 of FIG. 2, the ONU 10 of this embodiment further includes a wavelength tunable filter 14 used for tuning a wavelength of a downlink signal to be received. The wavelength tunable filter 14 can tune the transmission wavelength between λd1 and λdm.

The wavelength arrangement of the downlink signal and an uplink signal in the optical communication system 303 is similar to the example in the optical communication system 301 of FIG. 3.

A flow of the downlink signal in the optical communication system 303 will be described.

As an example thereof, a flow of the downlink signal from the optical transceiver 21-$i$ in the OLT 20 to the ONU 10-$j$ will be described.

The downlink signal of a wavelength λ$i$ transmitted from the optical transmitter 23-$i$ in the optical transceiver 21-$i$ in the OLT 20 reaches the optical power splitter 30'' through a wavelength multiplexer/demultiplexer 22-$i$ and an optical fiber 50-$i$. In the optical power splitter 30'', the downlink signal is equally distributed to optical fibers 60-1 to 60-$n$. Among the downlink signals, the downlink signal distributed to the optical fiber 60-$j$ (1≤$j$≤n) reaches an optical power splitter 40-$j$. In the optical power splitter 40-$j$, the downlink signal is equally distributed to the plurality of optical fibers 70. The downlink signal distributed to an optical fiber 70-$j$ reaches a wavelength tunable filter 14-$j$ through a wavelength multiplexer/demultiplexer 13-$j$ in the ONU 10-$j$. At this time, when the transmission wavelength of the wavelength tunable filter 14-$j$ is tunes to λd$i$, the downlink signal passes through the wavelength tunable filter 14-$j$ and reaches an optical receiver 12-$j$.

A flow of the uplink signal in the optical communication system 303 will be described.

As an example thereof, a flow of the uplink signal from the ONU 10-$j$ (1≤$j$≤n, $j$ is an integer) to the optical transceiver 21-$i$ (1≤$i$≤m, $i$ is an integer) in the OLT 20 will be described.

The uplink signal of the wavelength λ$q$ (1≤$q$≤m, $q$ is a natural number) transmitted from an optical transmitter 11-$j$ in the ONU 10-$j$ reaches the optical power splitter 30'' through the wavelength multiplexer/demultiplexer 13-$j$, the optical fiber 70-$j$, and the optical power splitter 40-$j$. In the optical power splitter 30'', the uplink signal is equally distributed to the plurality of optical fibers 50-1 to 50-$m$. Among the uplink signals, the uplink signal distributed to the optical fiber 50-$i$ reaches an optical receiver 24-$i$ through the wavelength multiplexer/demultiplexer 22-$i$ in the optical transceiver 21-$i$ in the OLT and the wavelength tunable filter 25-$i$.

Next, a means for detecting the ONU 10 which is newly connected the optical communication system 303 of this embodiment is newly connected will be described.

This embodiment is the same as Embodiment 1 in that the OLT controller 90 transmits the search signal at a prescribed time, and the ONU controller 80 tunes a wavelength of an optical transmitter 11 to a wavelength corresponding to the search signal and makes the optical transmitter 11 transmit a response signal to the OLT 20.

A means for tuning the wavelength of the optical transmitter 11 of the ONU 10 to a wavelength corresponding to the search signal is as follows. The OLT controller 90 includes, in the search signal, wavelength information of the wavelength set to the optical transmitter 11 of the ONU 10 which is unregistered, and the ONU controller 80 determines the wavelength of the optical transmitter 11 of the ONU 10 based on the wavelength information included in the search signal.

The ONU controller 80 changes periodically the wavelength that can be received by an transceiver 12 of the ONU 10, makes, when there is a search signal having the receivable wavelength, the transceiver 12 of the ONU 10 receive the search signal, and preferably determines the wavelength of the optical transmitter 11 of the ONU 10 based on the wavelength information included in the search signal.

Hereinafter, the above means will be described specifically. The OLT controller 90 makes the single OLT optical transceiver 21 transmit the search signal. Thus, the search signal used for detecting the unregistered ONU 10 is transmitted from an optical transceiver 21-1 to the OLT 20 periodically or as needed.

The search signal of a wavelength λd1 transmitted by the optical transceiver 21-1 reaches optical signal input ports (all the ONU connection ends of the optical transmission path 103) of all the ONUs 10. However, since the transmission wavelength of the wavelength tunable filter 14 in the ONU 10 is not always λd1, the ONU 10 which cannot receive the search signal may exist. Thus, the unregistered ONU 10 periodically tunes the transmission wavelength of the wavelength tunable filter 14 in a range of λd1 to λdm.

When the ONU 10 transmits a signal to a specific optical receiver 24 of the OLT 20, the wavelength to be output is different according to what the signal is transmitted to which of the optical transceivers 21 (what the ONU 10 is connected to which of the ONU connection ends of the optical transmission path 103).

Thus, the OLT controller 90 includes, in the search signal, information designating a wavelength to be used when the unregistered ONU 10 responses. For example, when the response signal is intended to be received by the optical transceiver 21-1 in the OLT, the OLT controller 90 includes information, designating "λu1" as the wavelength to be used when the unregistered ONU 10 responses, in the search signal.

The unregistered ONU 10 having received the search signal tunes an output wavelength to the wavelength designated by the information included in the search signal and transmits the response signal to the OLT 20. The wavelength information included in the search signal may not be one and a plurality of wavelengths. In this case, the ONU controller 80 determines one wavelength, randomly selected from a plurality of wavelengths of the wavelength information, as the wavelength of the optical transmitter 11 of the ONU 10. According to this configuration, the communication traffic of the OLT optical transceivers 21 can be uniformized. In this example, the unregistered ONU 10 tunes the wavelength of the response signal to $\lambda u1$.

The transmitted response signal passes through the optical power splitter 30" and reaches all the optical transceiver 21 through all the optical fibers 50. The response signal is output toward the optical receiver 24 by a wavelength multiplexer/demultiplexer 22. Since each transmission wavelength of wavelength tunable filters (25-2 to 25-*m*) is different from the wavelength of the response signal, the response signal is interrupted by the wavelength tunable filters (25-2 to 25-*m*). The response signal can be transmitted through only a wavelength tunable filter 25-1 and is received by an optical receiver 24-1. Accordingly, the OLT 20 can detect that the unregistered ONU 10 has been connected and can register the ONU 10.

By virtue of the above means, the optical communication system 303 can fully realize the detection of a newly connected ONU and the registration of the ONU in the OLT.

In this embodiment, although there has been described the example in which the optical transceiver 21-1 transmits the search signal and receives the response signal with respect to the search signal, the same holds for the case where this disclosure is carried out in other optical transceiver 21-*i* ($1 \leq i \leq m$, i is an integer) in the OLT.

Further, in the case where the optical transceiver 21 transmitting the search signal and the optical transceiver 21 receiving the response signal are different from each other, a similar operation can be realized by designating the wavelength of the response signal to the wavelength corresponding to the optical transceiver 21 receiving the response signal.

The OLT controller 90 may include, in the search signal, a reception wavelength of the OLT optical transceiver 21, intended to receive the response signal of the ONU 10, as the wavelength information. According to the communication state, deviation of the communication traffic among optical transceivers 21 in the OLT occurs. Thus, the OLT controller 90 includes the wavelength, received by the OLT optical transceiver 21, as the wavelength information in the search signal to connect the new ONU 10 to the OLT optical transceiver 21 having a free capacity. According to this configuration, the deviation of the communication traffic of the OLT optical transceivers 21 can be reduced.

The wavelength information included in the search signal is a plurality of weighted wavelengths associated with selection, and the ONU controller 80 may determine one wavelength, selected from a plurality of wavelengths of the wavelength information according to weighting, as the wavelength of the optical transmitter of the ONU 10. When the deviation of the communication traffic among optical transceivers 21 in the OLT occurs according to the communication state, the OLT controller 90 weighs the wavelength received by the OLT optical transceiver 21 and includes the wavelength as the wavelength information in the search signal to connect the new ONU 10 to the OLT optical transceiver 21 having a free capacity. According to this configuration, the deviation of the communication traffic of the OLT optical transceivers 21 can be reduced.

Embodiment 6

PS Branch Configuration, Directly Designating Response Wavelength with Plural Search Signals, Distributing Load with Plural LC, and Receiving Response Signal The configuration of this embodiment is the same as the optical communication system 303 of FIG. 7. Flows of an uplink signal and a downlink signal in an OLT 20 and an ONU 10 are similar to those in the optical communication system 301.

Figure 14:
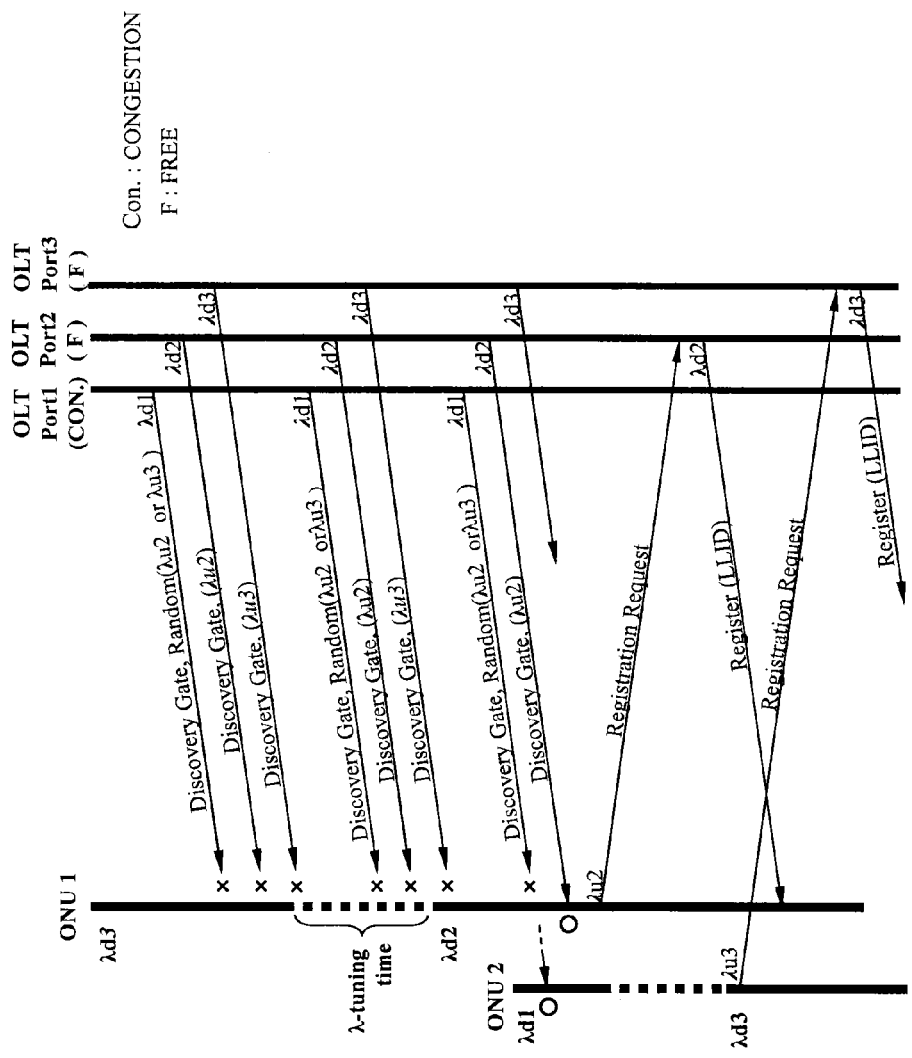
FIG. 14 is a view for explaining timings of the search signal which the bandwidth allocation device according to the present disclosure makes the OLT transmit and the response signal transmitted by the ONU.

Next, a means for detecting the ONU 10 to which the optical communication system 303 of this embodiment is newly connected will be described referring FIG. 14.

This embodiment is the same as Embodiment 1 in that the OLT controller 90 transmits a search signal (Discovery Gate) at a prescribed time, and the ONU controller 80 tunes a wavelength of an optical transmitter 11 to a wavelength corresponding to the search signal and makes the optical transmitter 11 transmit a response signal (Registration Request) to the OLT 20.

A means for tuning the wavelength of the optical transmitter 11 of the ONU 10 to the wavelength corresponding to the search signal is as follows. The OLT controller 90 includes wavelength information of the wavelength, set to the optical transmitter 11 of the unregistered ONU 10, in the search signal, and the ONU controller 80 determines the wavelength of the optical transmitter 11 of the ONU 10 based on the wavelength information included in the search signal.

The ONU controller 80 changes periodically the wavelength that can be received by the transceiver 12 of the ONU 10, makes, when there is a search signal having the receivable wavelength, the transceiver 12 of the ONU 10 receive the search signal, and preferably determines the wavelength of the optical transmitter 11 of the ONU 10 based on the wavelength information included in the search signal.

Hereinafter, the above means will be described specifically with reference to FIG. 14. The OLT controller 90 makes the OLT optical transceivers 21 (OLT Ports 21) transmit the search signals. Thus, the search signals used for detecting the unregistered ONU 10 are transmitted from a plurality of or all of the transceivers 21-1 to 21-*m* of the OLT 20 periodically or as needed. Hereinafter, an example in which the transceivers (21-1 to 21-3) transmit the search signals will be described.

All the search signals transmitted from the transceivers (21-1 to 21-3) reach optical signal input ports (all the ONU connection ends of the optical transmission path 103) of all the ONUS 10. However, since the transmission wavelength of the wavelength tunable filter 14 in the ONU 10 is not always tuned to the wavelength that transmits any of the search signals, the ONU 10 which cannot receive the search signal may exist. Thus, the unregistered ONU 10 periodically changes the transmission wavelength of the wavelength tunable filter 14 in a range of $\lambda d1$ to $\lambda dm$.

The OLT controller 90 includes information, designating the wavelength to be used when the unregistered ONU 10 responses, in the search signal. Then the wavelength information included in the search signal may not be one and a plurality of wavelengths. For example, when the response signals from the ONUs 10 are intended to be received by the transceivers (21-1 to 21-*m*) uniformly, the OLT controller 90 includes, in the search signal, information designating that the wavelength to be used when the unregistered ONU 10 responses is "one randomly selected between $\lambda u1$ and $\lambda um$". In FIG. 14, the search signal is expressed by "Discovery Gate random ($\lambda u2$ or $\lambda u3$)". When the wavelength information includes a single wavelength, the search signal is "Discovery Gate ($\lambda u2$)".

In the unregistered ONU 10 having received the search signal, the wavelength is randomly selected between $\lambda u1$ and $\lambda um$ by the ONU controller 80, and the ONU 10 tunes the output wavelength to the wavelength concerned and transmits the response signal (Registration Request) to the OLT 20. In FIG. 14, it is assumed that the unregistered ONU 10 (ONU2)

selects λu3 as the wavelength of the response signal and tunes the wavelength of the response signal to λu3.

The transmitted response signal passes through the optical power splitter 30″ and reaches all the optical transceiver 21 through all optical fibers 50. The response signal is output toward an optical receiver 24 by a wavelength multiplexer/demultiplexer 22. Since each transmission wavelength of wavelength tunable filters (25-2 to 25-*m*) is different from the wavelength (for example, λu3) of the response signal, the response signal is interrupted by the wavelength tunable filters (25-1 to 25-2 and 25-4 to 25-*m*). The response signal can be transmitted through only the wavelength tunable filter 25-3 and is received by an optical receiver 24-3. Accordingly, the OLT 20 can detect that the unregistered ONU 10 has been connected and can register the ONU 10. For example, the OLT 20 notifies completion of registration in the ONU 10 with a Register signal including LLID (Logical Link. ID).

By virtue of the above means, the optical communication system 303 can rapidly and fully complete detection of a newly connected ONU and registration of the ONU in the OLT in comparison with the case where the search signal is transmitted by the single optical transceiver 21, and the response signal is received by the single optical transceiver 21.

In this embodiment, there has been described the example in which the optical transceivers (21-1 to 21-3) transmit the search signals, and the optical transceivers (21-1 to 21-*m*) receive the response signals with respect to the search signal with an equal probability, the same holds for the case where a combination of not less than 2 and not more than m arbitrary numbers of the transceivers 21 transmits the search signal.

The OLT controller 90 can include the reception wavelength of the OLT optical transceiver 21 which receives the response signal of the ONU 10 in the search signal as the wavelength information. As an instruction designating the response signal, the wavelength is not designated as "one randomly selected between λu1 and λum" but can be selected from a set in which any wavelength of λu1 to λum is an element. By virtue of such means, the optical transceiver 21 which is intended to receive the response signal can receive the response signal while a load is evenly distributed to each element of an arbitrary group (for example, a set of uncongested transceivers 21 in which an enough space exists in a band of the uplink signal).

The wavelength information included in the search signal is a plurality of weighted wavelengths associated with selection, and the ONU controller 80 may determine one wavelength, selected from a plurality of wavelengths of the wavelength information according to the weighting, as the wavelength of the optical transmitter of the ONU 10. As an instruction designating the response signal as described above, the wavelength is not designated as "one randomly selected between λu1 and λum", but the probability can be biased according to a congestion degree of each of the transceivers 21. By virtue of such means, the optical transceiver 21 which is to receive the response signal is determined with the probability corresponding to the weighting (for example, the probability of the uncongested transceivers 21 in which an enough space exists in the band of the uplink signal is increased), and the response signal can be received by the optical transceiver 21 while a load is evenly distributed to the transceivers 21.

Hereinafter, the optical communication systems of the above embodiments will be described.

(1)

The optical communication systems of the above embodiments are one-to-many connection type optical communication systems constituted of one OLT and a plurality of ONUs in which the OLT is provided with one or a plurality of optical transceivers constituted of a pair of an optical transmitter capable of tuning output wavelengths and an optical receiver, the ONU is provided with an optical transceiver constituted of a pair of an optical transmitter capable of tuning output wavelengths and an optical receiver, the OLT and the ONU are connected through one or a plurality of optical power splitters or wavelength filters, and a combination in which the transmitter in the OLT and the receiver in the ONU communicate with each other and a combination in which the transmitter in the ONU and the receiver in the OLT communicate with each other change temporally. In this optical communication system, the OLT has means for searching an unregistered ONU periodically.

(2)

The optical communication systems of the above embodiments have, as a first means for searching the unregistered ONU periodically described in (1), a means for transmitting a search signal used for detecting the unregistered ONU periodically at fixed intervals over the entire wavelength used for downlink communication, and the search signal includes anyone of or a plurality of information including information of wavelength of the search signal, information of a port of the wavelength filter to which the transceiver in the OLT as a transmission source is connected, information of a port of the wavelength filter to which the transceivers in all the OLTs are connected, and information of the wavelength to be used when each of the ONUs responses, wherein, the ONU has a means for receiving the search signal transmitted from one or a plurality of transceivers of the OLT and means for transmitting a response signal with respect to the search signal toward the transceiver in the single OLT based on the information included in the search signal.

(3)

The optical communication systems of the above embodiments have, as a second means for searching the unregistered ONU periodically described in (1), a means for transmitting a search signal used for detecting the unregistered ONU periodically at fixed intervals over the entire wavelength used for downlink communication, and the ONU has means for receiving the search signal transmitted from one or a plurality of transceivers of the OLT and a means described in (2) for calculating information of a port of the wavelength filter to which the ONU itself is connected from a combination of the "information of the wavelength of the search signal" and the "information of the port of the wavelength filter to which the transceiver in the OLT as a transmission source is connected" wherein an output wavelength used in a response signal with respect to the transceiver in the OLT is determined, and the response signal is transmitted.

REFERENCE SIGNS LIST

10, 10-1, 10-2, . . . , 10-*j*, . . . , 10-*n*: ONU
11, 11-1, 11-2, . . . , 11-*j*, . . . , 11-*n*: Optical transmitter
12, 12-1, 12-2, . . . , 12-*j*, . . . , 12-*n*: Optical receiver
13, 13-1, 13-2, . . . , 13-*j*, . . . , 13-*n*: Wavelength multiplexer/demultiplexer
14, 14-1, 14-2, . . . , 14-*j*, . . . , 14-*n*: Wavelength tunable filter
20: OLT
21, 21-1, 21-2, . . . , 21-*i*, . . . , 21-*m*: Transceiver
22, 22-1, 22-2, . . . , 22-*i*, . . . , 22-*m*: Wavelength multiplexer/demultiplexer
23, 23-1, 23-2, . . . , 23-*i*, . . . , 23-*m*: Optical transmitter
24, 24-1, 24-2, . . . , 24-*i*, . . . , 24-*m*: Optical receiver
25: Wavelength tunable filter 30: Wavelength filter
30': Wavelength filter
30", 31: Optical power splitter
32: Optical fiber
40, 40-1, 40-2, ..., 40-j, ..., 40-n: Optical power splitter
50, 50-1, 50-2, ..., 50-j, ..., 50-n: Optical fiber
60, 60-1, 60-2, ..., 60-j, ..., 60-n: Optical fiber
70, 70-1, 70-2, ..., 70-j, ..., 70-n: Optical fiber
80, 80-1, 80-2, ..., 80-j, ..., 80-n: ONU controller
90: OLT controller
101, 102, 103: Optical transmission path
301, 302, 303: Optical communication system

The invention claimed is:

1. A bandwidth allocation device of a PON system which includes:
    an OLT having one or a plurality of OLT optical transceivers in which an optical transmitter transmitting a downlink signal and an optical receiver receiving an uplink signal make a pair,
    an ONU having one or a plurality of ONU optical transceivers in which an optical transmitter transmitting the uplink signal so that a wavelength of the uplink signal can be tuned and an optical receiver receiving the downlink signal make a pair, and
    an optical transmission path in which the number of ONU connection ends to which the ONU is connected is not less than the number of the ONUs and which connects the OLT and the ONU, the bandwidth allocation device comprising:
    an OLT controller which makes each of the OLT optical transceivers transmit a search signal at a prescribed time so that the search signals reach all the ONU connection ends of the optical transmission path, wherein the search signal includes information that designates a wavelength; and
    an ONU controller which, when the ONU connected to the ONU connection end of the optical transmission path is unregistered and receives the search signal, tunes a wavelength of the optical transmitter of the ONU according to the information included in the search signal that designates the wavelength, and makes the optical transmitter transmit a response signal to the OLT.

2. The bandwidth allocation device according to claim 1, wherein
    the OLT controller includes, in the search signal, wavelength information of a wavelength set to the optical transmitter of the unregistered ONU which is unregistered, and
    the ONU controller determines the wavelength of the optical transmitter of the ONU based on the wavelength information included in the search signal.

3. The bandwidth allocation device according to claim 1, wherein
    the OLT controller includes, in the search signal, wavelength information of a wavelength of the search signal and identification information for identifying the optical transmitter of the OLT transmitting the search signal, and
    the ONU controller has a correspondence table of the wavelength information and a wavelength set to the optical transmitter of the ONU with respect to the identification information and determines the wavelength of the optical transmitter of the ONU based on the wavelength information and the identification information included in the search signal.

4. The bandwidth allocation device according to claim 1, wherein
    the ONU has one or a plurality of GNU optical transceivers in which an optical transmitter transmitting the uplink signal so that a wavelength of the uplink signal can be tuned and an optical receiver receiving the downlink signal which is intend so that a reception wavelength can be tuned make a pair,
    the OLT controller includes, in the search signal, wavelength information of a wavelength set to an optical transmitter of the unregistered ONU, and
    the ONU controller periodically changes a wavelength that can be received by a transceiver of the ONU, makes the transceiver of the GNU receive the search signal when there is the search signal having the receivable wavelength, and determines a wavelength of an optical transmitter of the ONU based on the wavelength information included in the search signal.

5. The bandwidth allocation device according to claim 4, wherein the OLT controller makes the single OLT optical transceiver transmit the search signal.

6. The bandwidth allocation device according to claim 4, wherein the OLT controller makes a plurality of the OLT optical transceiver transmit the search signal.

7. The bandwidth allocation device according to claim 4, wherein
    the wavelength information included in the search signal is a plurality of wavelengths, and
    the ONU controller determines one wavelength, randomly selected from a plurality of wavelengths of the wavelength information, as the wavelength of the optical transmitter of the ONU.

8. The bandwidth allocation device according to claim 7, wherein the OLT controller includes, in the search signal, a reception wavelength of the OLT optical transceiver, intend to receive the response signal of the ONU, as the wavelength information.

9. The bandwidth allocation device according to claim 4, wherein
    the wavelength information included in the search signal is a plurality of weighted wavelengths associated with selection, and
    the ONU controller determines one wavelength, selected from a plurality of wavelengths of the wavelength information according to the weighting, as the wavelength of the optical transmitter of the ONU.

10. A bandwidth allocation method of a PON system, which includes:
    an OLT having one or a plurality of OLT optical transceivers in which an optical transmitter transmitting a downlink signal and an optical receiver receiving an uplink signal make a pair,
    an ONU having one or a plurality of ONU optical transceivers in which an optical transmitter transmitting the uplink signal so that a wavelength of the uplink signal can be tuned and an optical receiver receiving the downlink signal make a pair, and
    an optical transmission path in which the number of ONU connection ends to which the ONU is connected is not less than the number of the ONUs and which connects the OLT and the ONU, the bandwidth allocation method comprising:
    a search signal transmission step of transmitting a search signal from each of the OLT optical transceivers at a prescribed time so that the search signals reach all the ONU connection ends of the optical transmission path, wherein the search signal includes information that designates a wavelength; and
    a response signal transmission step of, when the ONU connected to the ONU connection end of the optical transmission path is unregistered and receives the search signal, tuning a wavelength of an optical transmitter of the ONU according to the information included in the search signal that designates the wavelength, and transmitting a response signal to the OLT.

11. The bandwidth allocation method according to claim 10, wherein
in the search signal transmission step, wavelength information of a wavelength set to an optical transmitter of the unregistered ONU is included in the search signal, and
in the response signal transmission step, the wavelength of the optical transmitter of the ONU is determined based on the wavelength information included in the search signal.

12. The bandwidth allocation method according to claim 10, wherein
in the search signal transmission step, wavelength information of a wavelength of the search signal and identification information for identifying an optical transmitter of the OLT transmitting the search signal are included in the search signal, and
in the response signal transmission step, there is a correspondence table of the wavelength information and a wavelength set to the optical transmitter of the ONU with respect to the identification information, and the wavelength of the optical transmitter of the ONU is determined based on the wavelength information and the identification information included in the search signal.

13. The bandwidth allocation method according to claim 10, wherein
the ONU has one or a plurality of ONU optical transceivers in which an optical transmitter transmitting the uplink signal so that a wavelength of the uplink signal can be tuned and an optical receiver receiving the downlink signal which is intended so that a reception wavelength can be tuned make a pair,
in the search signal transmission step, wavelength information of a wavelength set to the optical transmitter of the unregistered ONU is included in the search signal, and
in the response signal transmission step, a wavelength which can be received by a transceiver of the ONU is periodically changed, and when there is the search signal having a receivable wavelength, the search signal is received by the transceiver of the ONU, and the wavelength of the optical transmitter of the ONU is determined based on the wavelength information included in the search signal.

14. The bandwidth allocation method according to claim 13, wherein in the search signal transmission step, the search signal is transmitted by the single OLT optical transceiver.

15. The bandwidth allocation method according to claim 13, wherein in the search signal transmission step, the search signal is transmitted by a plurality of the OLT optical transceivers.

16. The bandwidth allocation method according to claim 13, wherein
the wavelength information included in the search signal is a plurality of wavelengths, and
in the response signal transmission step, one wavelength randomly selected from a plurality of wavelengths of the wavelength information is determined as the wavelength of the optical transmitter of the ONU.

17. The bandwidth allocation method according to claim 16, wherein in the search signal transmission step, a reception wavelength of the OLT optical transceiver intended to receive the response signal of the ONU is included as the wavelength information in the search signal.

18. The bandwidth allocation method according to claim 13, wherein
the wavelength information included in the search signal is a plurality of weighted wavelengths associated with selection, and
in the response signal transmission step, one wavelength selected from a plurality of wavelengths of the wavelength information according to the weighting is determined as the wavelength of the optical transmitter of the ONU.

* * * * *